(12) United States Patent
Morise (10) Patent No.: US 11,913,546 B2
(45) Date of Patent: Feb. 27, 2024

(54) VEHICULAR PARKING DEVICE

(71) Applicant: TOYOTA JIDOSHA KABUSHIKI KAISHA, Toyota (JP)

(72) Inventor: Masaru Morise, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/307,763

(22) Filed: Apr. 26, 2023

(65) Prior Publication Data

US 2024/0011560 A1 Jan. 11, 2024

(30) Foreign Application Priority Data

Jun. 29, 2022 (JP) ................................. 2022-105170

(51) Int. Cl.
*F16H 63/34* (2006.01)
(52) U.S. Cl.
CPC ................................ *F16H 63/3433* (2013.01)
(58) Field of Classification Search
CPC ............ F16H 63/3433; F16H 63/3416; F16H 63/3425; F16H 63/3466; B60T 1/005; B60T 1/062; F16D 63/006
See application file for complete search history.

(56) References Cited

U.S. PATENT DOCUMENTS

2021/0172521 A1* 6/2021 Weinl ..................... F16H 63/38
2021/0197771 A1* 7/2021 Frister ................. F16H 63/3475

FOREIGN PATENT DOCUMENTS

DE 102019100972 A1 * 7/2020
JP 2018141520 A 9/2018
WO WO-0210619 A1 * 2/2002 ............. B60T 1/005

* cited by examiner

*Primary Examiner* — Richard M Lorence
*Assistant Examiner* — Aimee Tran Nguyen
(74) *Attorney, Agent, or Firm* — Hunton Andrews Kurth LLP (57) ABSTRACT

A parking lock device for positioning a parking head moved to a parking position in a parking position and holding the parking state includes a first switching mechanism and a second switching mechanism. The first switching mechanism is switched between a coupled state in which the parking head and the parking rod are coupled to each other and a non-coupled state in which the first switching mechanism is relatively movable. The second switching mechanism is switched between a locked state in which the parking head is positioned in the fixed case and an unlocked state in which the parking rod is retracted in the locked state to release the positioning of the parking head with respect to the fixed case.

4 Claims, 8 Drawing Sheets

REVERSE POSITION (NON-PARKING)

FIG. 3B

FIRST FORWARD POSITION (PARKING STATE)

FIG. 3C

SECOND FORWARD POSITION (PARKING LOCK STATE)

VEHICULAR PARKING DEVICE

CROSS-REFERENCE TO RELATED APPLICATION

This application claims priority to Japanese Patent Application No. 2022-105170 filed on Jun. 29, 2022, incorporated herein by reference in its entirety.

BACKGROUND

1. Technical Field

The present disclosure relates to a vehicular parking device, and more particularly, to a technique for suppressing a P-removal in which a parking pawl comes off from a parking gear during parking in which a P position is selected.

2. Description of Related Art

Known is a vehicular parking device including: (a) a parking gear; (b) a parking pawl that is provided so as to be able to approach and move away from the parking gear and that mechanically suppresses rotation of the parking gear by being fitted to the parking gear; (c) a parking head that is disposed so as to be able to reciprocate between a parking position and a non-parking position and that brings the parking pawl close to the parking gear when moved to the parking position and sets a state to a parking state in which the rotation of the parking gear is suppressed; and (d) a head moving member that is mechanically connected to the parking head and that moves the parking head from the non-parking position to the parking position when a P position for parking is selected. A device described in Japanese Unexamined Patent Application Publication No. 2018-141520 (JP 2018-141520 A) is an example thereof, in which a wedge 75 corresponds to a parking head, and a parking rod 74 corresponds to a head moving member.

In such a vehicular parking device, when the P position for parking is selected by a shift lever or the like, the parking head is moved to the parking position and the parking pawl is fitted with the parking gear so that a wheel is locked so as not to be rotatable via the rotating shaft on which the parking gear is provided. In that case, if the road surface slope of the parked place is large, a pushing load that pushes the parking pawl out of the parking gear may be generated in accordance with rotational torque applied to the parking gear by the weight of the vehicle, and the pushing load may cause the parking head to be retracted to the non-parking position side, causing the P-removal in which the parking pawl comes off the parking gear. In view of this, in JP 2018-141520 A, a stopper (wedge restricting means) is provided in the moving path of the parking head (wedge) so that the stopper can be advanced and retracted, and thus the stopper hinders retraction of the parking head to suppress the P-removal from occurring.

SUMMARY

However, in the vehicular parking device described in JP 2018-141520 A, since it is necessary to dispose the stopper in the support member configuring a moving path of the parking head so that the stopper can advance and retreat, or to provide a link mechanism for advancing and retreating the stopper, there is a possibility that a large design change including the support member is necessary and there is a possibility that the device is increased in size.

The present disclosure has been made in view of the above circumstances, and an object of the present disclosure is to suppress a P-removal during parking on a slope while suppressing an increase in size of a device apparatus without requiring a large design change.

A vehicular parking device according to a first aspect of the present disclosure includes:
a parking gear;
a parking pawl that is provided so as to be able to approach and move away from the parking gear and that mechanically suppresses rotation of the parking gear by being fitted to the parking gear;
a parking head that is disposed so as to be able to reciprocate between a parking position and a non-parking position and that brings the parking pawl close to the parking gear when moved to the parking position and sets a state to a parking state in which the rotation of the parking gear is suppressed; and
a head moving member that is mechanically connected to the parking head and that moves the parking head from the non-parking position to the parking position when a P position for parking is selected; and
a parking lock device that positions the parking head in the parking position and holds the parking head in the parking state, the P position being selected and the parking head being moved to the parking position.
Here,
the parking lock device is configured to include a first switching mechanism that is mechanically switched between a connecting state and a non-connecting state by suppression of movement of the parking head to the parking position side after the parking head reaches the parking position in accordance with the head moving member moving in an advancing direction, the connecting state being a state in which the parking head is moved integrally with the head moving member to the parking position in the advancing direction and the non-connecting state being a state in which the head moving member is allowed to be relatively moved in the advancing direction with respect to the parking head, when a moving direction of the head moving member that moves the parking head to the parking position side is set as the advancing direction and a moving direction of the head moving member that moves the parking head to the non-parking position side is set as a retreating direction; and the parking lock device is configured to include a second switching mechanism that is mechanically switched in accordance with relative movement of the head moving member and the parking head such that when the parking head reaches the parking position and the head moving member is relatively moved in the advancing direction with respect to the parking head, a state becomes a lock state in which the parking head is positioned in a fixing member so as to suppress the parking head from retreating to the non-parking position side, and when the head moving member is made to relatively move in the retreating direction in the lock state, positioning of the parking head with respect to the fixing member is released and the state becomes a non-lock state in which retreat of the parking head is allowed.

In a second disclosure, the vehicular parking device of the first disclosure is characterized in that: (a) the parking lock device includes a first member that is moved integrally with the head moving member and a second member that is moved integrally with the parking head; (b) the second member includes a first fitting portion provided with a first fitting hole to which the first member is fitted so as to be movable in an axial direction, and a second fitting portion fitted in a second fitting hole provided in the fixing member such that the second fitting portion is movable in the axial direction, the first fitting portion and the second fitting portion being provided on the same axis; (c) the first switching mechanism includes a first locking member disposed so as to be able to project outward from an outer peripheral surface of the first member, a first engaging recess portion that is provided on an inner peripheral surface of the first fitting hole of the second member and that is engaged with the first locking member, and an elastic member that urges the first locking member so as to project outward, the first locking member is engaged with the first engaging recess portion in accordance with an urging force of the elastic member, causing the first member and the second member to be brought into the connecting state, and the first locking member is pushed inward of the first member against the urging force of the elastic member, causing the first member to be brought into the non-connecting state in which the first member is allowed to be relatively moved in the advancing direction with respect to the second member; and (d) the second switching mechanism includes a second locking member disposed so as to be able to project outward from an outer peripheral surface of the second fitting portion of the second member, a second engaging recess portion that is provided on an inner peripheral surface of the second fitting hole of the fixing member and that is engaged with the second locking member, and a pushing out engaging portion that is provided in the first member and that pushes the second locking member outward and makes the second locking member engage with the second engaging recess portion when the parking head reaches the parking position and the first member is moved relative to the second member in the advancing direction, the second locking member being brought into the lock state in which the second member is suppressed from retreating to the non-parking position side by the second locking member being pushed outside from the second member by the pushing out engaging portion and engaged with the second member, and the non-lock state due to release of engagement of the second locking member and the second engaging recess portion by the pushing out engaging portion is released when the first member is caused to relatively retreat to the non-parking position side with respect to the second member in the lock state.

In a third disclosure, the vehicular parking device according to the second disclosure is characterized in that the fixing member is provided with a pushing in engaging portion that is engaged with the first locking member projecting outward from an outer peripheral surface of the first member, immediately before the parking head is made to move to the parking position, and the first locking member that pushes in the first locking member to to an intermediate position against the urging force of the elastic member.

In a fourth disclosure, the vehicular parking device of the second or third disclosure is characterized in that: (a) a pair of the first locking members is arranged symmetrically with respect to the axis in a through hole provided so as to be orthogonal to an axis of the first member, the first locking members are urged in opposite directions away from each other by the common elastic member disposed between the first locking members, and the first locking members protrude outward from an outer peripheral surface of the first member and are engaged with the first engaging recess portion; and (b) a pair of the second locking members is arranged symmetrically with respect to the axis in a through hole provided so as to be orthogonal to an axis of the second member, the second locking members are pushed out in opposite directions away from each other by the common pushing out engaging portion disposed in the first member so as to project along an axis of the second member, and the second locking members protrude outward from an outer peripheral surface of the second member and are made to engage with the second engaging recess portion.

In such a vehicular parking device, a parking lock device including a first switching mechanism and a second switching mechanism is provided, and when the parking head is moved forward to the parking position integrally with the head moving member while the first switching mechanism is in the connecting state and the second switching mechanism is in the unlocked state, the state becomes the parking state in which the parking pawl is fitted to the parking gear. In this state, when the head moving member is moved forward further, the first switching mechanism is switched to the non-connecting state and the head moving member is relatively moved to the parking head, and the second switching mechanism is switched to the lock state and the parking head is positioned on the fixing member and is suppressed from being retracted toward the non-parking position side. Accordingly, even if a pushing out load that pushes the parking pawl out of the parking gear is generated due to a road surface gradient or the like, and a force in a direction in which the parking head is retracted toward the non-parking position side is applied based on the pushing out load, retreat of the parking head is suppressed and the P-removal in which the parking pawl comes off the parking gear is suppressed. In this case, it is only necessary to provide the parking lock device having the first switching mechanism and the second switching mechanism, and since the states of the first switching mechanism and the second switching mechanism are mechanically switched in accordance with the movement of the head moving member, a large design change of the support member or the like is unnecessary and the disclosure can be easily applied to the conventional vehicular parking device, and the device can be configured compactly.

In the vehicular parking device according to the first aspect:
the parking lock device includes a first member and a second member; the first switching mechanism includes a first locking member, a first engaging recess portion, and an elastic member, and a state is switched between the connecting state and the non-connecting state in accordance with whether the first locking member and the first engaging recess portion are engaged; and the second switching mechanism includes a second locking member, a second engaging recess portion, and a pushing out engaging portion, and a state is switched between the connecting state and the non-connecting state in accordance with whether the second locking member and the second engaging recess portion are engaged. As a result, it is possible to appropriately obtain an effect that the device can be easily applied to a conventional vehicular parking device and that the device can be configured compactly.

In the vehicular parking device according to the first aspect, the pushing in engaging portion is provided in the fixing member, and the first locking member of the first switching mechanism is pushed in to the intermediate position immediately before the parking head is moved to the parking position. Thus, switching of the first switching mechanism from the connecting state to the non-connecting state that is performed in accordance with the head moving member moving forward after the parking head reaches the parking position is smoothly performed. That is, it is possible to securely connect the parking head and the head moving member with a large connection strength by the connection state of the first switching mechanism and move the parking head to the parking position, and the state can be set to the parking state in which the parking pawl is fitted to the parking gear, and it is possible to perform smoothly perform, with a relatively small force, movement of the head moving member at the time of further moving the head moving member forward while switching the first switching mechanism to the non-connection state and switching the second switching mechanism to the lock state. Further, since the pushing in engaging portion only pushes in the first locking member to the intermediate position, when the head moving member is retracted to release the parking state, the first locking member is engaged with the first engaging recess portion by the urging force of the elastic member midway, and the first switching mechanism is in the connecting state, and the parking head is retracted integrally with the head moving member and the parking state is released.

In the vehicular parking device according to the first aspect, the pair of first locking members of the first switching mechanism is arranged symmetrically with respect to the axis of the first member, and the pair of second locking members of the second switching mechanism is arranged symmetrically with respect to the axis of the second member. Thus, the connecting state in which the head moving member and the parking head are integrally connected by the first switching mechanism is stabilized, and the lock state in which the parking head is positioned in the fixing member by the second switching mechanism is stabilized, and a series of parking operations including switching of the first switching mechanism and the second switching mechanism by the movement of the head moving member are stably performed. Further, since the pair of first locking members of the first switching mechanism is urged so as to project outward by the common elastic member and the pair of second locking members of the second switching mechanism is pushed outward by the common pushing out engaging portion, the parking lock device can be easily and compactly configured with a small number of parts.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The vehicular parking device of the present disclosure is applied to a shift-by-wire (SBW) type parking device that electrically establishes a shift position selected by a shift position selection device such as a shift lever by a shift actuator such as an electric motor. The vehicular parking device of the present disclosure can also be applied to a manually operated parking device that is mechanically switched to a plurality of shift positions via an interlocking device such as a link or a cable by a shift lever. The shift position includes at least a parking P (parking) position that blocks power transmission and mechanically blocks rotation of the parking gear, and the parking device is in a parking state when the P position is selected. The vehicular parking device can be applied to various vehicles such as an engine-driven vehicle including an engine that generates power by burning fuel as a power source, a battery electric vehicle driven by an electric motor, and a hybrid electric vehicle including a plurality of power sources.

The parking gear is provided on a rotation shaft (such as an output shaft) that is mechanically rotated in accordance with the rotation of the wheel. By fitting the parking pawl to the parking gear, the rotation of the rotation shaft and the rotation of the wheel are mechanically suppressed. The parking head is disposed at a distal end of a head moving member such as a parking rod, and is reciprocated to a parking position and a non-parking position together with the head moving member. The parking head is connected to the head moving member by a biasing device such as a spring member or to a member further upstream than the head moving member so that relative movement of the parking head when the parking pawl interferes with the parking gear is permitted.

The parking lock device includes, for example, a first member and a second member. The first switching mechanism is configured to include a first locking member, a first engaging recess portion, and an elastic member, and the second switching mechanism is configured to include a second locking member, a second engaging recess portion, and a pushing out engaging portion. On the other hand, the first member may be integrally provided with the head moving member, or the second member may be integrally provided with the parking head. It is also possible to dispose the first locking member and the elastic member of the first switching mechanism in the second member, and to provide the first engaging recess portion in the first member. The shape of the first engaging recess portion is determined according to the shape of the first locking member. For example, in the case where the first locking member is a ball or the tip is a hemispherical shape, the shape of the first engaging recess portion is suitably a concave portion having a spherical shape having substantially the same curvature as the curvature, a concave portion having a truncated conical shape, or the like. Alternatively, in the case where the first member and the second member have a cylindrical shape, the shape of the first engaging recess portion is suitably an annular groove having an arc-shaped cross section or a V-shaped cross section. The same applies to the second engaging recess portion.

The fixing member is provided with a pushing in engaging portion that is engaged with the first locking member, for example, just before the parking head is moved to the parking position, and pushes the first locking member to an intermediate position against the biasing force of the elastic member. On the other hand, it is also possible to omit the pushing in engaging portion. The second member includes, for example, a first fitting portion provided with a first fitting hole to which the first member is fitted so as to be movable in the axial direction, and a second fitting portion to be fitted so as to be movable in the axial direction in a second fitting hole provided in the fixing member on the same axial line. On the other hand, the first member, the second member, and the fixing member do not necessarily have to be fitted together, and the first switching mechanism and the second switching mechanism may be provided on top of each other so as to be stacked.

A plurality of first locking members may be disposed about the axis of the first member, but may be disposed only at one location of the first member. A plurality of the second locking members may be disposed around the axis of the second member, but may be disposed at only one position of the second member. In the case where the first locking member and the second locking member are provided at a plurality of positions, for example, a plurality of the first locking members are disposed around the axis of the first member, and the plurality of first locking members are biased so as to project outward from the outer peripheral surface of the first member by the elastic members, respectively, while the plurality of second locking members are disposed around the axis of the second member, the plurality of second locking members, the first member so as to project along the axis of the second member It may be configured to be extruded outward from the outer peripheral surface of the second member by the common pushing out engaging portion provided on the member. For example, a pair of first locking members may be disposed symmetrically with respect to the axis in the through-hole provided so as to be orthogonal to the axis of the first member, and a pair of second locking members may be disposed symmetrically with respect to the axis in the through-hole provided so as to be orthogonal to the axis of the second member. It is also possible to dispose three or more first locking members at equal angular intervals around the axis of the first member, or to dispose three or more second locking members at equal angular intervals around the axis of the second member.

Hereinafter, an embodiment of the present disclosure will be described in detail with reference to the drawings. Note that, in the following embodiment, the drawings are appropriately simplified or modified for convenience of description, and the dimensional ratios and shapes of the respective parts are not necessarily drawn accurately.

Figure 1:
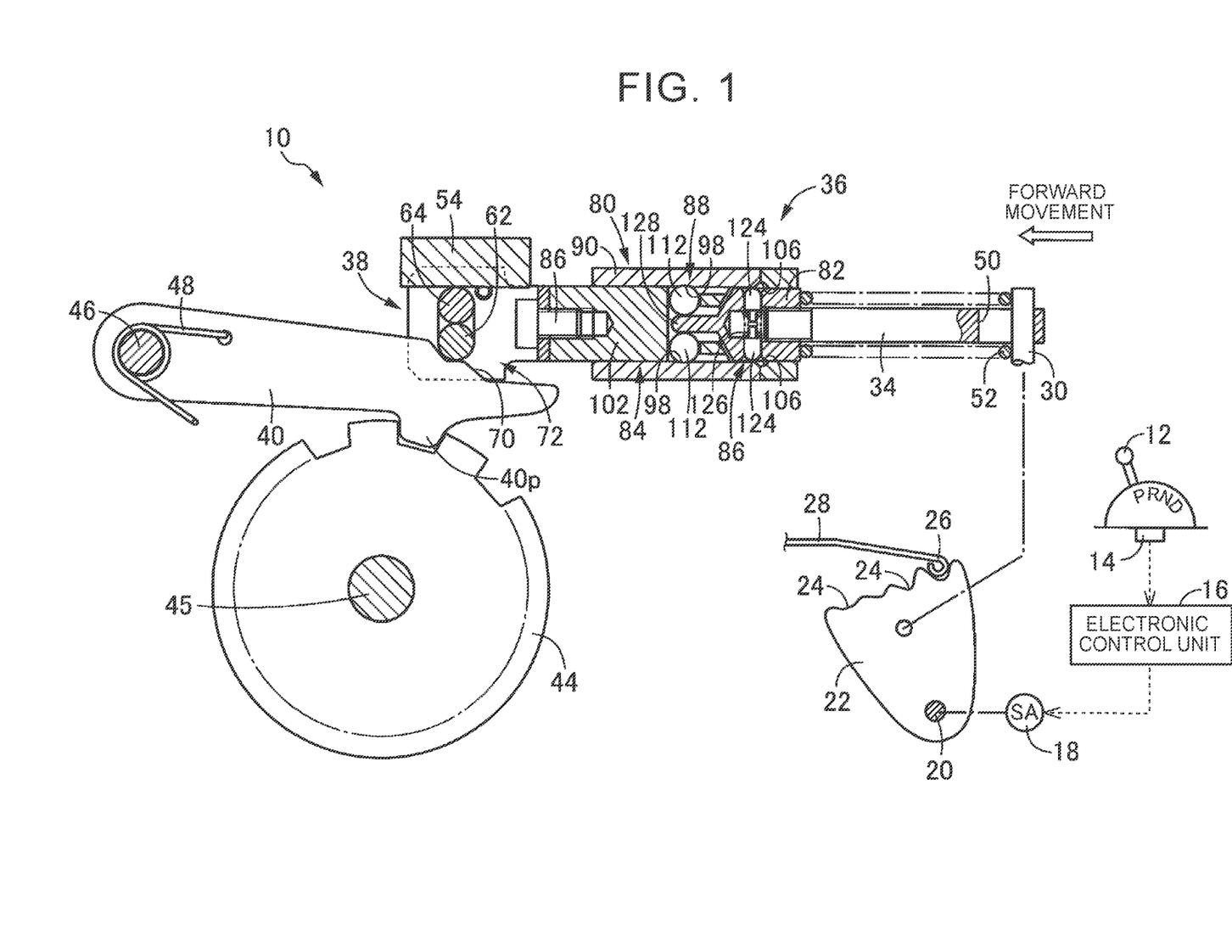
FIG. 1 is a schematic configuration diagram illustrating a parking lock state of a vehicular parking device according to an embodiment of the present disclosure, in which a main portion is shown in a cross section.

FIG. 1 is a schematic configuration diagram for explaining a parking lock state of a vehicular parking device 10 according to an embodiment of the present disclosure, and is a diagram showing a main part in a cross section. The vehicular parking device 10 is a SBW type parking device that operates a shift actuator 18 such as an electric motor by an electronic control unit 16 in accordance with a shift position selected by a shift lever 12 and rotates a detent plate 22 via a manual shaft 20 to electrically switch a shift position, which is a power transmission condition of an automated transmission (not shown). The shift lever 12 is disposed in the vicinity of the driver's seat, and is operated to four positions of P (parking), R (reverse), N (neutral), and D (drive) according to the driver's shift operation. The P position is an operation position for selecting a P position for parking that blocks power transmission and mechanically blocks rotation of the rotation shaft 45 such as an output shaft of the automatic transmission. The R position is an operation position for selecting an R position that enables backward travel. The N position is an operation position for selecting an N position for shutting off power transmission. The D position is an operation position for selecting a D position that enables forward travel. The operation position of the shift lever 12 is detected by the lever position sensor 14, and the selected shift position is determined by the electronic control unit 16 according to the operation position. The shift lever 12 corresponds to a shift position selection device. The shift position is sometimes referred to as a shift range.

The detent plate 22 is pivoted about the axis of the manual shaft 20 by the shift actuator 18 and is positioned at four pivot positions: the P position, the R position, the N position, and the D position, which are the P position, the R position, the N position, and the D position. The tip portion of the detent plate 22 is provided with irregularities having four positioning recesses 24 so that a locking portion 26 is engaged with the positioning recesses 24. The locking portion 26 is formed by rounding the distal end portion of the spring plate 28, and is displaced following the uneven shape by the elastic deformation of the spring plate 28 fixed to the transmission case or the like, and a predetermined degree (positioning force) is applied to the detent plate 22 at each rotation position of P, R, N, and D. A manual valve or the like is connected to the detent plate 22 via a link or the like (not shown), and the oil path of the hydraulic control circuit is switched in accordance with the selected shift position.

A parking rod 34 is connected to the detent plate 22 via a connecting shaft 30, and the parking rod 34 is reciprocated substantially linearly in the longitudinal direction, that is, in the left-right direction in FIG. 1 along with the rotation of the detent plate 22, and the operating state of the vehicular parking device 10 is switched according to the position of the parking rod 34. A parking head 38 is connected to the distal end portion of the parking rod 34 via a parking lock device 36, and when the parking head 38 is moved (advanced) to the parking position shown in FIG. 1, the parking pawl 40 is rotated downward in FIG. 1, and the fitting teeth 40p are fitted to the parking gear 44. The parking gear 44 is mounted so as not to be relatively rotatable on a rotation shaft 45, which is mechanically rotated as the wheels rotate, such as an output shaft of the automatic transmission. The parking pawl 40 is disposed in the transmission case or the like so as to be rotatable about the axis of the pole shaft 46 parallel to the rotation shaft 45, and is biased in the fitting releasing direction (counterclockwise direction in FIG. 1) by the return spring 48 which is a biasing device, and the parking head 38 rotates the parking pawl 40 in the fitting direction (clockwise direction in FIG. 1) against the biasing force of the return spring 48. That is, the parking pawl 40 is arranged so that the fitting tooth 40p can be moved closer to and away from the parking gear 44, and when the parking pawl 40 is rotated by the parking head 38 in the fitting direction that is the lower side in FIG. 1, the fitting tooth 40p is brought closer to and fitted to the parking gear 44, and is in a parking state in which the rotation of the parking gear 44 and the rotation of the rotation shaft 45 and the wheels are mechanically suppressed.

The parking rod 34 is connected to the connecting shaft 30 via an elongated hole 50, and is held by a spring member (in the embodiment, a compression coil spring) 52 which is a biasing device on the forward side in the left direction of FIG. 1, which is usually on the parking position side with respect to the connecting shaft 30, and rotates the parking pawl 40 in the fitting direction via the parking head 38. However, if the mating teeth 40p of the parking pawl 40 interfere with the parking gear 44, the parking rod 34 together with the parking head 38 is allowed to retreat toward the non-parking position, which is the right direction of FIG. 1, relative to the coupling shaft 30, against the biasing force of the spring member 52. The parking head 38 is supported by a support member 54 fixed to the transmission case or the like so as not to escape to the upper side in FIG. 1. The parking head 38 is configured to be linearly reciprocated between the parking position shown in FIG. 1 and the non-parking position shown in FIG. 2, and the support member 54 has a length dimension capable of supporting the parking head 38 between the parking position and the non-parking position.

Figure 2:
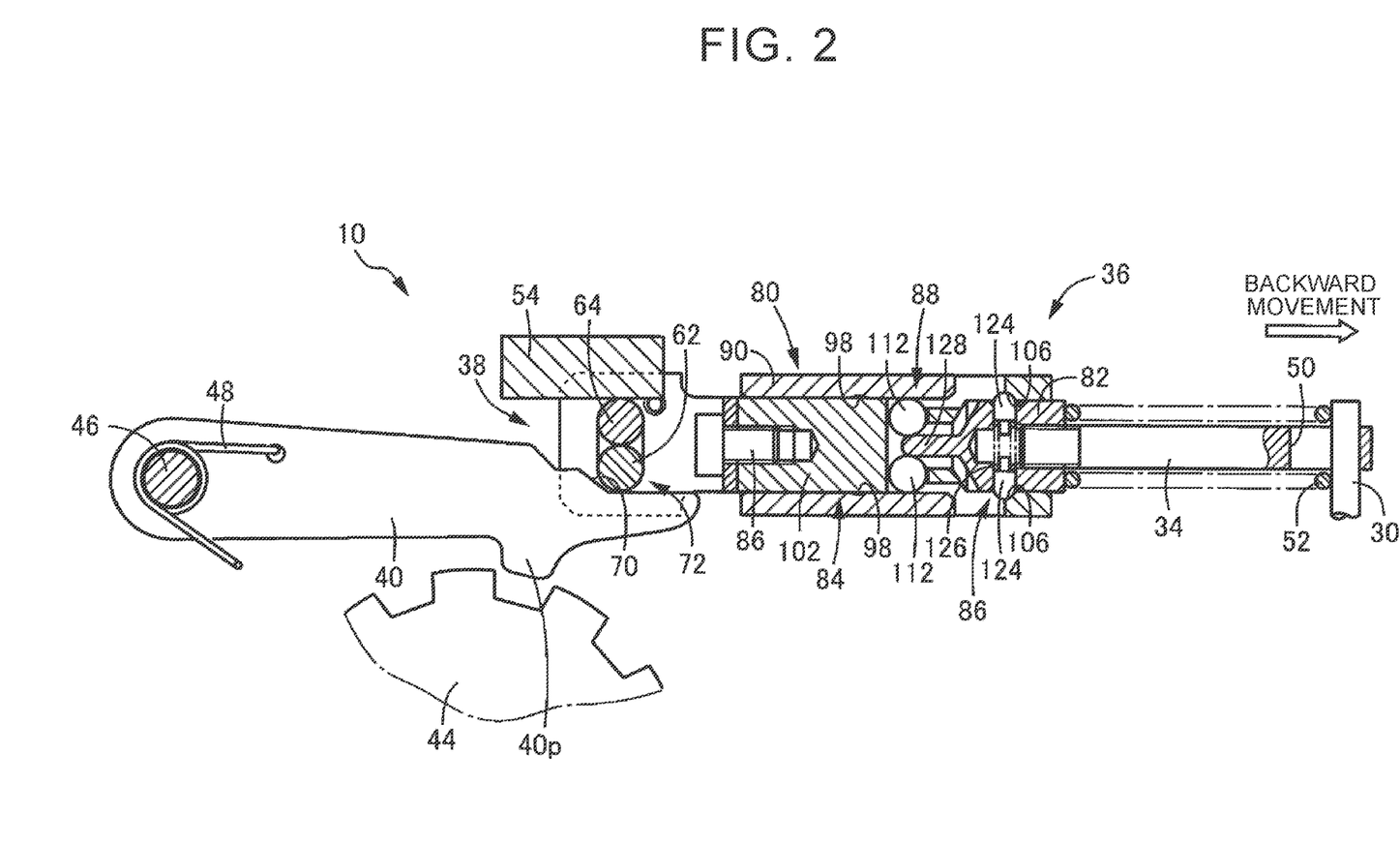
FIG. 2 is a cross-sectional view illustrating a non-parking state in which the parking head of FIG. 1 is retracted to a non-parking position.
Figure 3A:
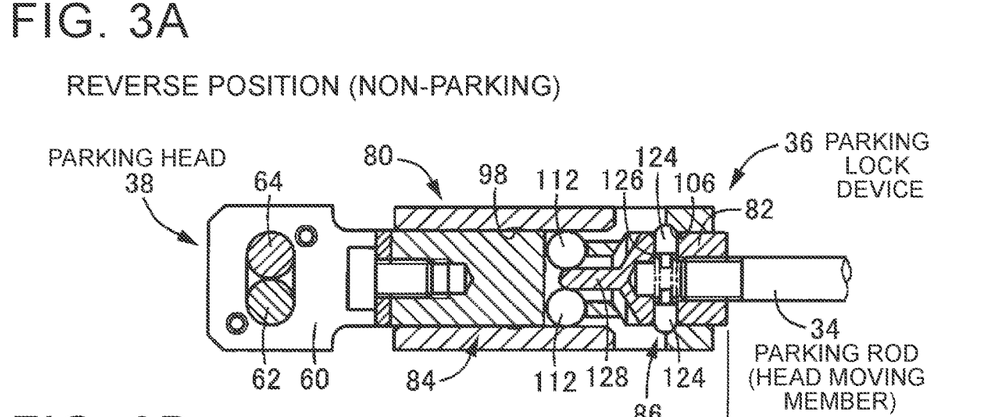
FIG. 3A is a cross-sectional view of a main portion of the vehicular parking device of FIG. 1.
Figure 3B:
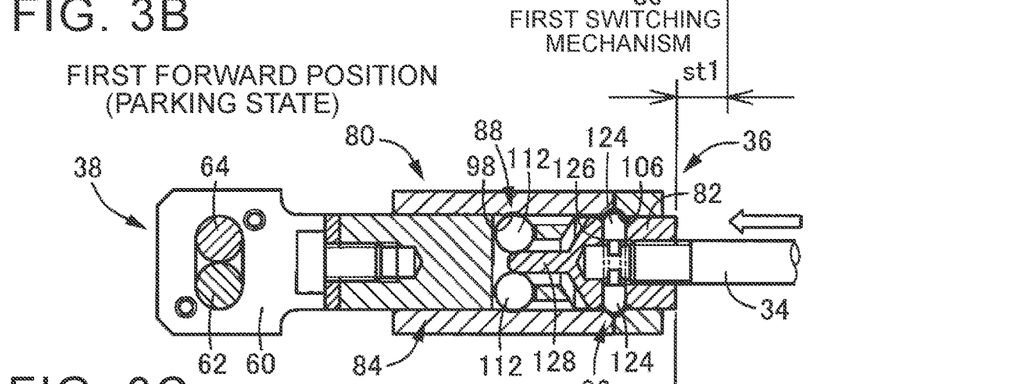
FIG. 3B is a cross-sectional view of a main portion of the vehicular parking device of FIG. 1.
Figure 3C:
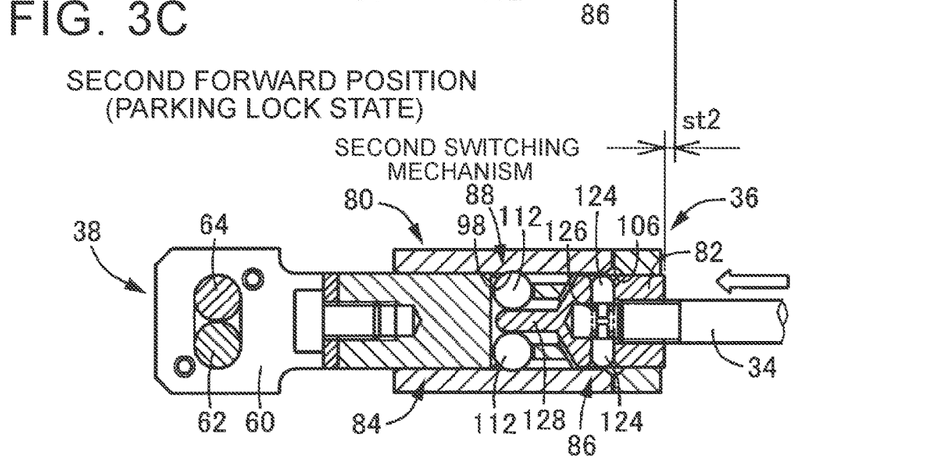
FIG. 3C is a cross-sectional view of a main portion of the vehicular parking device of FIG. 1.

FIG. 1 is a view showing a parking lock state in which the parking rod 34 is advanced through the coupling shaft 30 and the parking lock device 36 locks the vehicular parking device 10 in the parking state in a case where the P position is selected by the shift lever 12 and the detent plate 22 is rotated to the P position in the counterclockwise direction around the axis of the manual shaft 20. FIG. 2 is a diagram illustrating a non-parking state of the vehicular parking device 10 in which a non-P position such as a D position is selected and the parking rod 34 is retracted to a retracted position. FIG. 3A, FIG. 3B, FIG. 3C are a cross-sectional view of a main part of the vehicular parking device 10 in a view for explaining the operation thereof. FIG. 3A is a view corresponding to FIG. 2 in a non-parked state in which a non-P position such as a D position is selected and the parking rod 34 is retracted to a retracted position which is the right direction of FIG. 3 via the coupling shaft 30. The position of the parking head 38 illustrated in FIG. 3A is a non-parking position. FIG. 3B is a view showing a parked state in which the P position is selected, the parking rod 34 is advanced to the first advanced position via the coupling shaft 30, and the parking head 38 is advanced to the parking position. FIG. 3C is a view corresponding to FIG. 1 in a parking lock state in which the parking rod 34 is further advanced to the second forward position (forward end position) and the parking lock device 36 locks the vehicular parking device 10 in the parking state. As the detent plate 22 rotates, the parking rod 34 is reciprocated between a retracted position shown in FIG. 3A and a second forward position shown in FIG. 3C. That is, the first advancing position illustrated in FIG. 3B is a position where further advancement of the parking head 38 is suppressed, and the parking rod 34 is continuously moved between the retracted position illustrated in FIG. 3A and the second advancing position illustrated in FIG. 3C without stopping in the first advancing position.

Figure 4:
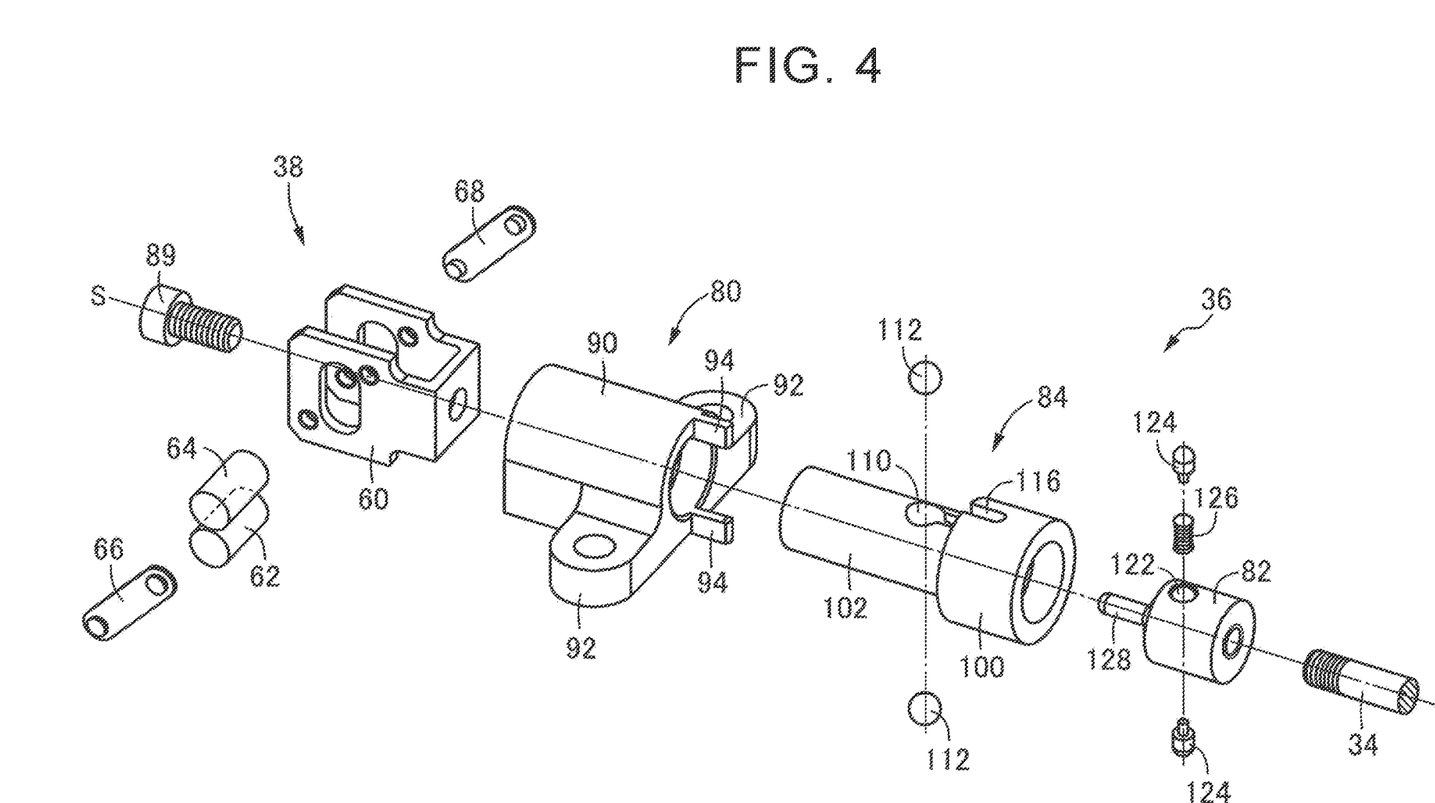
FIG. 4 is a perspective view illustrating a parking lock device included in the vehicular parking device of FIG. 1, in which a plurality of components are exploded together with a parking head and a parking rod.

FIG. 4 is an exploded perspective view of a plurality of components of the parking lock device 36 with the parking rod 34 and the parking head 38. In FIG. 4, S is an assembly center line, and is a common center line of a plurality of components in the assembled state.

As is apparent from FIG. 4, the parking head 38 includes a U-shaped support member 60, a pair of first rollers 62, and a pair of second rollers 64. Long holes are provided in the pair of side walls of the support member 60, and the rollers 62 and 64 are rotatably supported. Presser plates 66 and 68 are attached to the outside of the pair of side walls of the support member 60 to prevent the rollers 62 and 64 from falling off. The first roller 62 and the second roller 64 are arranged vertically between the parking pawl 40 and the support member 54 arranged on both sides of the parking head 38 in the vertical direction. Then, the first roller 62 on the side of the parking pawl 40 is engaged with the parking pawl 40 when the parking head 38 is moved from the non-parking position to the parking position, and the parking pawl 40 is brought close to the parking gear 44 to be fitted, and the parking pawl 40 is provided with a cam surface 70 which is engaged with the first roller 62 to rotate the parking pawl 40 in the fitting direction, as shown in FIGS. 1 and 2. The cam surface 70 includes an inclined surface for rotating the parking pawl 40 in the fitting direction, a parking-side engagement surface provided on the parking position side (left side in FIG. 1) continuously with the inclined surface, and a non-parking-side engagement surface provided on the non-parking position side (right side in FIG. 1) continuously with the inclined surface. The parking-side engagement surface is a portion engaged with the first roller 62 in the parking state of FIG. 1 and is provided so as to be substantially parallel to the moving direction of the parking head 38 in the parking state. Further, the non-parking side engagement surface is provided so as to be substantially parallel to the moving direction of the parking head 38 in the non-parking state at a portion engaged with the first roller 62 in the non-parking state of FIG. 2.

The second roller 64 on the side of the support member 54 is engaged with the support member 54 when the parking head 38 is moved between the parking position and the non-parking position to restrict the parking head 38 from being displaced to the opposite side of the parking pawl 40. That is, when the parking head 38 is moved from the non-parking position to the parking position, the first roller 62 and the second roller 64 are pressed between the parking pawl 40 and the support member 54, and are relatively rotated in a state where the outer peripheral surface is in contact with each other, whereby the parking head 38 is restricted from being displaced to the opposite side of the parking pawl 40, and the parking pawl 40 can be rotated in the fitting direction by the engagement between the first roller 62 and the cam surface 70 to be fitted into the parking gear 44. In the present embodiment, a cam mechanism 72 that includes the first roller 62, the second roller 64, and the cam surface 70 to fit the parking pawl 40 close to the parking gear 44 is configured. The parking rod 34 that reciprocates the parking head 38 corresponds to a head moving member. Note that the detent plate 22 and the coupling shaft 30 can also be regarded as a head moving member.

As is apparent from FIG. 4, the parking lock device 36 includes a fixed case 80 fixed to a transmission case or the like, an inner rod 82 integrally moved with the parking rod 34, and an outer rod 84 integrally moved with the parking head 38. The parking lock device includes a first switching mechanism 86 and a second switching mechanism 88 illustrated in FIGS. 1 to 3. The inner rod 82 is integrally fixed to the parking rod 34 by screw fastening in the present embodiment, but may be moved integrally with the parking rod 34 at the time of parking operation or release, for example, instead of disposing the elongated hole 50 and the spring member 52 between the parking rod 34 and the connecting shaft 30, it is also possible to provide a play mechanism having a similar function between the inner rod 82 and the parking rod 34. The parking head 38 is integrally fixed to the outer rod 84 via a bolt 89, but may be moved integrally with the outer rod 84 during parking operation or release, and may be swingably connected via a link or the like, for example. The fixing case 80 corresponds to a fixing member, the inner rod 82 corresponds to a first member, and the outer rod 84 corresponds to a second member.

Figure 5:
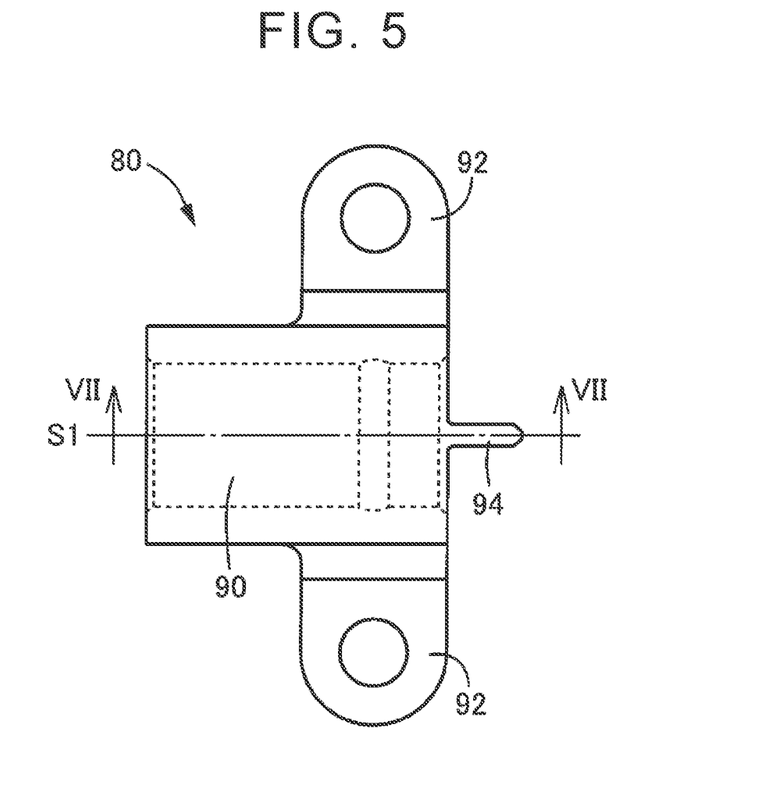
FIG. 5 is a plan view of a fastening case, which is one of the components of the parking lock device of FIG. 4.
Figure 6:
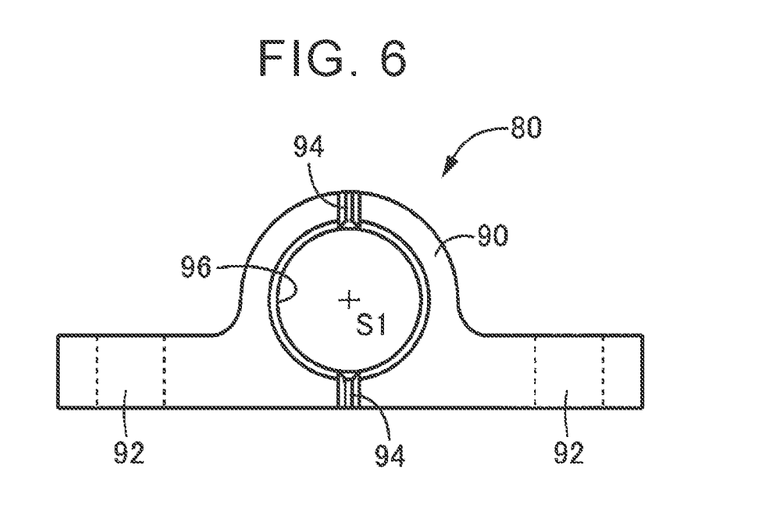
FIG. 6 is a right side view of the fixation case of FIG. 5.
Figure 7:
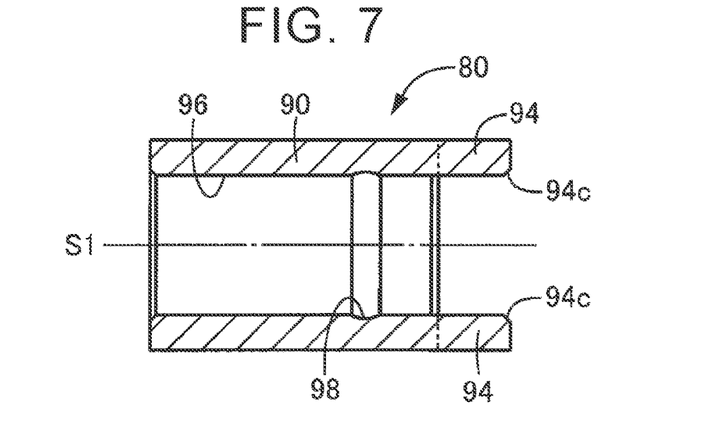
FIG. 7 is a cross-sectional view of a part of FIG. 5 taken along the arrow VII-VII.

The fixing case 80 is configured as shown in FIGS. 5 to 7. FIG. 5 is a plan view of the fixed case 80, FIG. 6 is a right side view as viewed from the right side of FIG. 5, and FIG. 7 is a cross-sectional view of a part of FIG. 5 viewed from the arrow VII-VII. The fixed case 80 is integrally provided with a cylindrical case body 90 having an axis S1 as a center, and a pair of flanges 92 extending from the case body 90 at right angles to the axis S1. The shaft S1 is fixed to the transmission case or the like via the flange 92 at a position parallel to the moving direction of the parking head 38 and concentric with the parking head 38 by a bolt (not shown). One axial end portion of the case body 90, that is, an end portion opposite to the parking head 38, the end portion on the non-parking position side, a pair of pushing in engaging portions 94 at two symmetrical positions about the axial S1 are provided so as to protrude parallel to the axial line S1. In addition, at a predetermined axial position of the inner peripheral surface 96 of the case main body 90, an annular groove 98 having an arc-shaped cross section is provided on the entire circumference around the axial S1. The inner peripheral surface 96 corresponds to a second fitting hole into which the outer rod 84 is fitted so as to be movable in the axial direction.

Figure 8:
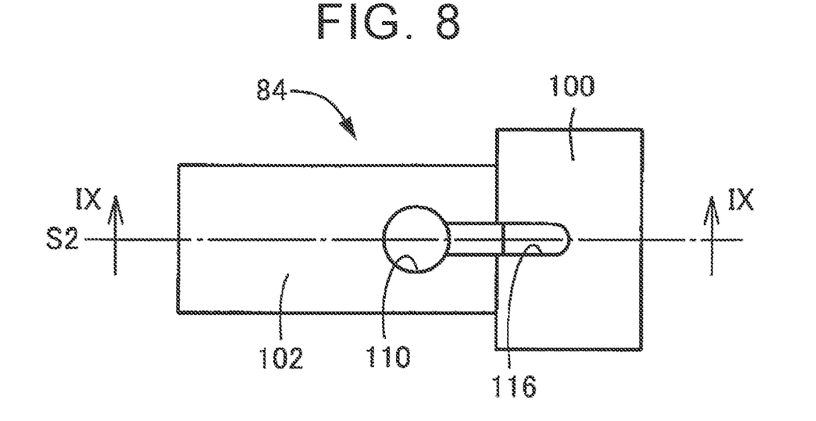
FIG. 8 is a plan view of an outer rod that is one of the components of the parking lock device of FIG. 4.
Figure 9:
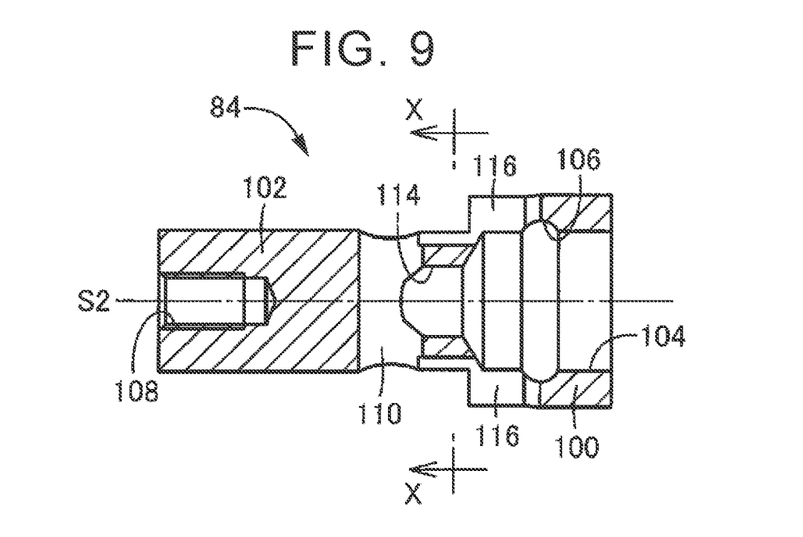
FIG. 9 is a cross-sectional view of a part of FIG. 8 taken along the arrow IX-IX.
Figure 10:
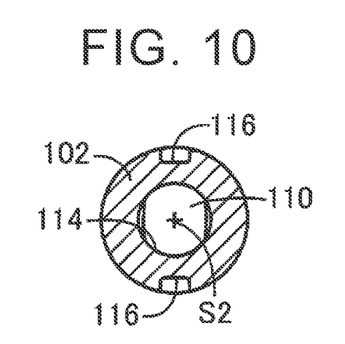
FIG. 10 is a cross-sectional view of a part of FIG. 9 taken along the arrow X-X.

The outer rod 84 is configured as shown in FIGS. 8 to 10. FIG. 8 is a plan view of the outer rod 84, FIG. 9 is a cross-sectional view of a portion of FIG. 8 viewed from IX-IX arrow, and FIG. 10 is a cross-sectional view of a portion of FIG. 9 viewed from X-X arrow. The outer rod 84 is integrally provided with the large diameter portion 100 on the side of the parking rod 34 and the small diameter portion 102 on the side of the parking head 38 on the same axial S2. The large-diameter portion 100 has a cylindrical shape centered on the axial line S2, and at a predetermined axial position of the inner peripheral surface 104, an annular groove 106 having an arc-shaped cross section is provided on the entire circumference around the axial line S2. The inner peripheral surface 104 corresponds to a first fitting hole into which the inner rod 82 is fitted so as to be movable in the axial direction, and the large diameter portion 100 corresponds to a first fitting portion. The small-diameter portion 102 is a portion of the fixed case 80 that is fitted into the case body 90 so as to be movable in the axial direction, and corresponds to a second fitting portion. A screw hole 108 to which a bolt 89 for fixing the parking head 38 is screwed is provided on an end surface of the small-diameter portion 102. The small-diameter portion 102 is provided with a through-hole 110 so as to be perpendicular to the axial S2, and a pair of balls 112 (see FIG. 4 and the like) constituting the second switching mechanism 88 are accommodated therein, and a communication hole 114 is provided coaxially with the axial S2 so as to communicate with the through-hole 110 at the bottom of the cylindrical large-diameter portion 100. In addition, a pair of slits 116 is provided at two positions symmetrical with respect to the axial S2 at the border between the small-diameter portion 102 and the large-diameter portion 100 in parallel to the axial line S2. The slit 116 is a bottomed groove in the small-diameter portion 102, but is a through groove reaching the inner peripheral surface 104 in the large-diameter portion 100, and is provided up to a position reaching the annular groove 106 in an axial direction parallel to the axial line S2. When the parking head 38 integrally fixed to the outer rod 84 is moved from the non-parking position to the parking position as shown in (a) to FIG. 3B in FIG. 3, the pair of pushing in engaging portions 94 of the fixing case 80 are relatively inserted into the slits 116 of the outer rod 84, and the tip of the pushing in engaging portion 94 reaches the annular groove 106.

Figure 11:
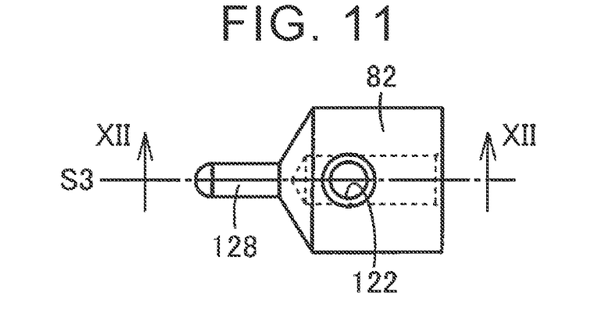
FIG. 11 is a plan view of an inner rod that is one of the components of the parking lock device of FIG. 4.
Figure 12:
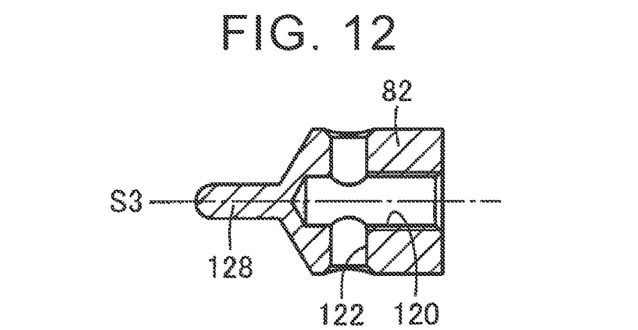
FIG. 12 is a cross-sectional view of a part of FIG. 11 taken along the arrow XII-XII.

The inner rod 82 is configured as shown in FIGS. 11 and 12. FIG. 11 is a plan view of the inner rod 82, and FIG. 12 is a cross-sectional view of a part of FIG. 11 viewed from XII-XII arrow. The inner rod 82 has a cylindrical shape centered on the axial S3, and is fitted in the large-diameter portion 100 of the outer rod 84 so as to be relatively movable in the axial direction. A screw hole 120 is provided coaxially with the axial line S3 on the end surface of the parking rod 34, and the parking rod 34 is screwed and integrally fixed. A through-hole 122 is provided at a predetermined axial position of the inner rod 82 so as to be perpendicular to the axial S3, and a pair of cylindrical locking pins 124 (see FIG. 4 and the like) constituting the first switching mechanism 86 are accommodated therein. An elastic member 126 constituted by a single compression coil spring is interposed between the pair of locking pins 124, and the pair of locking pins 124 are biased in opposite directions away from each other. The distal end portion of the locking pin 124 has a hemispherical shape, the curvature is substantially the same as the curvature of the arc of the annular groove 106 provided in the outer rod 84, in the embodiment is a small size (small radius dimension), by being biased so as to protrude outward from the outer peripheral surface of the inner rod 82 by the elastic member 126 by being engaged with the annular groove 106, the inner rod 82 and the outer rod 84 is connected state in a predetermined connection strength so as not to be relatively movable in the axial direction.

In the retracted position of the parking rod 34 shown in FIG. 3A, the first switching mechanism 86 is connected, when the parking rod 34 is advanced from that state, the parking head 38 is advanced together with the inner rod 82 and outer rod 84 in the connected state, when it reaches the first forward position advanced by the stroke st1 ((b) in FIG. 3), the parking head 38 reaches the parking position further advancement is suppressed. The parking position is defined, for example, by the first roller 62 of the parking head 38 being brought into contact with a stopper or the like provided on the parking pawl 40, but may be defined by the contact between the outer rod 84 and the fixed case 80. When the parking rod 34 is further advanced in this state, the engagement between the locking pin 124 having a hemispherical shape and the annular groove 106 having an arcuate shape causes the locking pin 124 to be pushed inward of the inner rod 82 against the biasing force of the elastic member 126, and is pulled out of the annular groove 106, thereby bringing the inner rod 82 into an uncoupled state which allows relative movement in the forward direction with respect to the outer rod 84. That is, the first switching mechanism 86 has a connection state in which the parking head 38 and the parking rod 34 are connected at a predetermined connection strength at a predetermined connection position, and the parking head 38 is integrally moved to the parking position when the parking rod 34 is advanced from the retreat position toward the parking position side, and a non-connection state in which the parking rod 34 is allowed to move relative to the parking head 38 in the forward direction when the parking head 38 reaches the parking position and further advancement is suppressed, and the connection state and the non-connection state are mechanically switched with the movement of the parking rod 34.

On the other hand, in the second forward position of FIG. 3C, the first switching mechanism 86 is in an uncoupled state, and when the parking rod 34 is retracted from this state and returned to the first forward position shown in FIG. 3B, the pair of locking pins 124 are engaged with the annular groove 106 by the biasing force of the elastic member 126 and are in a coupled state. Then, when the parking rod 34 is further retracted to the retracted position shown in FIG. 3A in the connected state, the parking head 38 is retracted from the parking position to the non-parking position together with the inner rod 82 and the outer rod 84 in the connected state, and the vehicular parking device 10 is brought into the non-parking state. The annular groove 106 corresponds to the first engaging recess portion, and the locking pin 124 corresponds to the first locking member, and the first switching mechanism 86 includes the annular groove 106, the locking pin 124, and the elastic member 126.

Here, just before the parking rod 34 is advanced from the retracted position of FIG. 3A and reaches the first forward position of FIG. 3B, that is, immediately before the parking head 38 reaches the parking position, the pushing in engaging portion 94 provided in the fixing case 80 is engaged with the locking pin 124 protruding outward from the outer peripheral surface of the inner rod 82, and in the first forward position, the locking pin 124 is pushed inward of the inner rod 82 against the biasing force of the elastic member 126. An inclined surface 94c (see FIG. 7) is provided at a corner portion engaged with the locking pin 124 at the distal end of the pushing in engaging portion 94, and a part of the distal end protrudes from the outer peripheral surface of the inner rod 82 only by pushing the locking pin 124 to the intermediate position. Thus, in the connected state of the first switching mechanism 86, the parking head 38 and the parking rod 34 are reliably connected with a large connection strength to move the parking head 38 to the parking position, the parking pawl 40 can be brought into a parking state to be fitted to the parking gear 44, and the first switching mechanism 86 is smoothly switched from the connected state to the disconnected state in accordance with the forward movement of the parking rod 34 after the parking head 38 reaches the parking position. Further, when the parking rod 34 is retracted to the first forward position shown in FIG. 3B when releasing the parking state, the locking pin 124 is engaged with the annular groove 106 in accordance with the biasing force of the elastic member 126 to be in a connected state, and thereafter, the parking head 38 is retracted integrally with the parking rod 34 to appropriately release the parking state.

Returning to FIGS. 11 and 12, the inner rod 82, the end surface of the side opposite to the screw hole 120 to which the parking rod 34 is connected, i.e., the side to be fitted in the large diameter portion 100 of the outer rod 84, the axial S3 and the pushing out engaging portion 128 projecting parallel to the projecting is provided coaxially with the axial S3. The pushing out engaging portion 128 has a cylindrical shape centered on the axial S3, and has a hemispherical shape at its distal end. When the inner rod 82 is fitted into the large-diameter portion 100 and the first switching mechanism 86 is in the connected state, the pushing out engaging portion 128 is inserted through the communication hole 114 of the outer rod 84 and protrudes into the through hole 110. The pushing out engaging portion 128 is partially inserted between the pair of balls 112 disposed in the through-hole 110 as shown in FIG. 3A and FIG. 3B. Then, as shown in FIG. 3C, when the first switching mechanism 86 is in a non-connected state and the inner rod 82 is moved relative to the outer rod 84 in the forward direction, the pushing out engaging portion 128 is made to penetrate between the pair of balls 112, and the balls 112 are pushed out in the opposite direction so as to be separated from each other.

With the parking head 38 reaching the parking position as shown in FIG. 3B, FIG. 3 (c), the ball 112 disposed on the outer rod 84 is in the same position as the annular groove 98 in the axial direction of the fixed case 80, is pushed outward from the outer peripheral surface of the small diameter portion 102 by the pushing out engaging portion 128 is engaged with the annular groove 98, the axial movement of the outer rod 84 is suppressed. The curvature of the ball 112 is substantially the same as the curvature of the arc of the annular groove 98, and is slightly larger (smaller in radial dimension) in the embodiment, so that the axial movement of the outer rod 84 is reliably suppressed. As a result, the parking head 38 integrally fixed to the outer rod 84 is suppressed from being retracted to the non-parking position side. In the connected state of the first switching mechanism 86 shown in FIG. 3A, FIG. 3 (b), only a portion of the distal end of the pushing out engaging portion 128 is between the pair of balls 112, the ball 112 comes out of the annular groove 98, the axial movement of the outer rod 84 is allowed in the unlocked state. That is, when the inner rod 82 is advanced with respect to the outer rod 84 by the stroke st2 together with the parking rod 34 as shown in FIG. 3B to FIG. 3C, the ball 112 is locked to be engaged with the ring-shaped slot 98. Further, in the locked state, when the inner rod 82 is retracted together with the parking rod 34 with respect to the outer rod 84 as shown in FIG. 3C to FIG. 3B, the engagement between the ball 112 and the annular groove 98 by the pushing out engaging portion 128 is released, and the unlocked state is obtained. Accordingly, when the parking rod 34 is further retracted to the retracted position as illustrated in FIG. 3B to FIG. 3A, the parking head 38 is retracted from the parking position to the non-parking position together with the inner rod 82 and the outer rod 84 in the connected state, and the vehicular parking device 10 is brought into the non-parking state. The annular groove 98 corresponds to the second engaging recess portion, and the ball 112 corresponds to the second locking member, and the second switching mechanism 88 includes the annular groove 98, the ball 112, and the pushing out engaging portion 128.

That is, the second switching mechanism 88 is in a state where the parking head 38 has reached the parking position as shown in FIG. 3B, when the parking rod 34 is moved relative to the parking head 38 in the forward direction from the connection position by the first switching mechanism 86 as shown in FIG. 3B to FIG. 3C, the parking head 38 is positioned in the fixed case 80 so as to prevent the parking head 38 from being retracted toward the non-parking position side. Further, in the locked state, when the parking rod 34 is relatively retracted toward the non-parking position side with respect to the parking head 38 as shown in FIG. 3C to FIG. 3B, the positioning of the parking head 38 with respect to the fixed case 80 is released, and the parking head 38 is brought into a non-locked state allowing the retraction.

The locked state and the unlocked state of the second switching mechanism 88 are mechanically switched with the relative movement of the parking rod 34 and the parking head 38.

Thus in the vehicular parking device 10 of the present embodiment includes a parking lock device 36 having a first switching mechanism 86 and the second switching mechanism 88, the first switching mechanism 86 in the connected state and the second switching mechanism 88 is in the unlocked state, FIG. 3 when the parking head 38 as FIG. 3BA is advanced integrally with the parking rod 34 to the parking position, the parking pawl 40 is in the parking state to be fitted to the parking gear 44. In this state, when the parking rod 34 is further advanced as shown in FIG. 3B to FIG. 3C, the first switching mechanism 86 is switched to the non-connected state and the parking rod 34 is moved relative to the parking head 38, and the second switching mechanism 88 is switched to the locked state so that the parking head 38 is positioned in the fixed case 80 and is suppressed from being retracted toward the non-parking position side. Accordingly, even if an extrusion load is generated by pushing the parking pawl 40 out of the parking gear 44 due to a road surface gradient or the like, and a force in a direction in which the parking head 38 is retracted toward the non-parking position side is applied based on the extrusion load, the backward movement of the parking head 38 is suppressed and P-removal in which the parking pawl 40 comes out of the parking gear 44 is suppressed. In that case, it is only necessary to provide the parking lock device 36 having the first switching mechanism 86 and the second switching mechanism 88, since the first switching mechanism 86 and the second switching mechanism 88 is mechanically switched state with the movement of the parking rod 34, a large design change of the support member 54 or the like is unnecessary and can be easily applied to the conventional vehicular parking device, it is possible to configure the vehicular parking device 10 compactly.

Further, the parking lock device 36 includes an inner rod 82 and an outer rod 84, and the first switching mechanism 86 includes a locking pin 124, an annular groove 106, and an elastic member 126, and is switched between a connected state and a non-connected state depending on whether or not the locking pin 124 and the annular groove 106 are engaged, while the second switching mechanism 88 includes a ball 112, an annular groove 98, and an pushing out engaging portion 128, and is switched between a locked state and a non-locked state depending on whether or not the ball 112 and the annular groove 98 are engaged. As a result, the present disclosure can be easily applied to a conventional vehicular parking device, and an effect that the vehicular parking device 10 can be configured compactly can be appropriately obtained.

Further, the pushing in engaging portion 94 is provided in the fixed case 80, since the locking pin 124 of the first switching mechanism 86 is pushed to the intermediate position immediately before the parking head 38 is moved to the parking position, the parking head 38 is moved to the parking position the first switching mechanism 86 is smoothly switched from the connected state to the non-connected state with the advancement of the parking rod 34. That is, the parking head 38 and the parking rod 34 are reliably connected to each other with a large connection strength by the connection state of the first switching mechanism 86 to move the parking head 38 to the parking position, and the parking pawl 40 can be brought into a parking state to be fitted to the parking gear 44, and the parking rod 34 can be moved with a relatively small force when the parking rod 34 is further advanced while the first switching mechanism 86 is switched to the non-connection state and the second switching mechanism 88 is switched to the locked state by further advancing. Further, since the pushing in engaging portion 94 only pushes the locking pin 124 to the intermediate position, when the parking rod 34 is retracted to release the parking state, the locking pin 124 in the first forward position shown in FIG. 3 (b) is engaged with the annular groove 106 by the biasing force of the elastic member 126 the first switching mechanism 86 is in the connected state, the parking head 38 is integrally retracted with the parking rod 34 parking state is released.

Further, the locking pin 124 of the first switching mechanism 86 is symmetrically disposed pair with respect to the axial S3 of the inner rod 82, since the ball 112 of the second switching mechanism 88 is symmetrically disposed pair with respect to the axial S2 of the outer rod 84, the first switching mechanism 86 with the connecting state for integrally connecting the parking rod 34 and the parking head 38 is stabilized, the locking state for positioning the parking head 38 in the fixed case 80 by the second switching mechanism 88 is stabilized, the first switching mechanism 86 by the movement of the parking rod 34, a series of parking operation including the switching of the second switching mechanism 88 is performed stably. Further, the pair of locking pins 124 of the first switching mechanism 86 is biased so as to project outward by the common elastic member 126, since the pair of balls 112 of the second switching mechanism 88 is pushed outward by the common pushing out engaging portion 128, the parking lock device 36 can be easily and compactly configured with a small number of parts.

Figure 13:
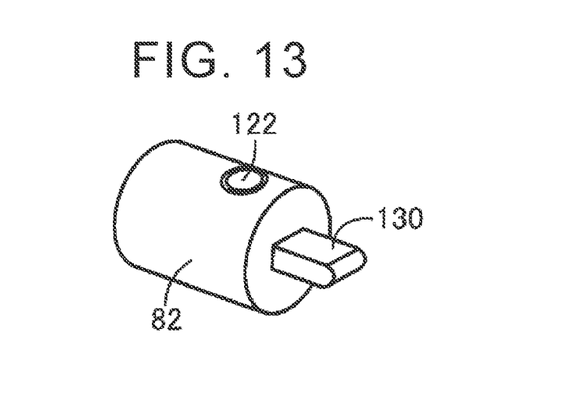
FIG. 13 is a diagram illustrating a modification of the inner rod in the embodiment of FIG. 1.

Incidentally, although the inner rod 82 in the above embodiment has been provided with a cylindrical pushing out engaging portion 128, since it is sufficient to push the pair of balls 112 in opposite directions, as shown in FIG. 13 it may be provided with a flat plate-shaped pushing out engaging portion 130. The distal end portion of the pushing out engaging portion 130 has a semicircular cross-section, but may have a wedge shape such as a triangular cross-section. The pushing out engaging portion 128 may also have a tapered shape such as a truncated conical shape.

Figure 14:
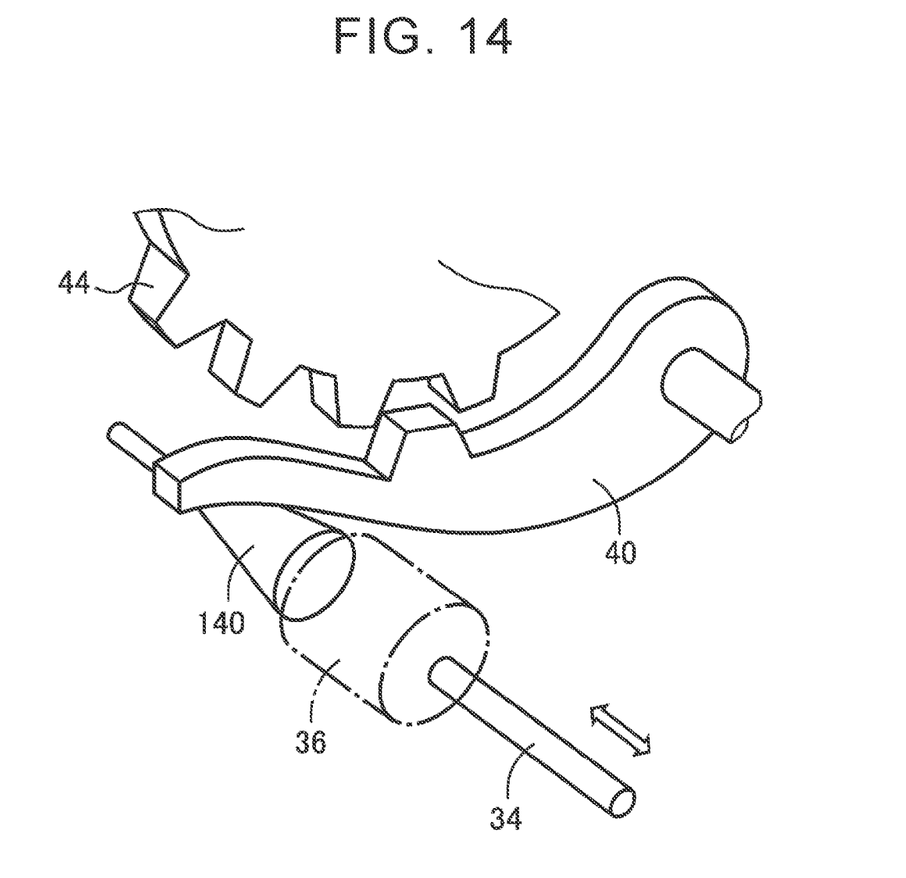
FIG. 14 is a schematic perspective view illustrating another embodiment of the present disclosure.

Although the parking head 38 of the above-described embodiment includes the pair of first rollers 62 and second rollers 64, a wedge-shaped parking head 140 such as a cone may be employed as shown in FIG. 14.

Although the embodiments of the present disclosure have been described in detail with reference to the drawings, the above description is merely an example, and the present disclosure can be implemented in various modified and improved modes based on the knowledge of those skilled in the art.

What is claimed is:

1. A vehicular parking device comprising:
  a parking gear;
  a parking pawl that is provided so as to be able to approach and separate from the parking gear and that mechanically suppresses rotation of the parking gear by being fitted to the parking gear;
  a parking head that is arranged so as to be reciprocally movable between a parking position and a non-parking position, and that is brought into a parking state in which the parking pawl is brought close to the parking gear and the rotation of the parking gear is suppressed when the parking head is moved to the parking position;

a head moving member that is mechanically connected to the parking head and that moves the parking head from the non-parking position to the parking position when a P position for parking is selected; and a parking lock device that positions the parking head in the parking position and holds the parking head in the parking state, the parking head being moved to the parking position when the P position is selected, wherein:

the parking lock device is configured to include a first switching mechanism that is mechanically switched between a connecting state and a non-connecting state by suppression of movement of the parking head to the parking position side after the parking head reaches the parking position in accordance with the head moving member moving in an advancing direction, the connecting state being a state in which the parking head is moved integrally with the head moving member to the parking position in the advancing direction and the non-connecting state being a state in which the head moving member is allowed to be relatively moved in the advancing direction with respect to the parking head, when a moving direction of the head moving member that moves the parking head to the parking position side is set as the advancing direction and a moving direction of the head moving member that moves the parking head to the non-parking position side is set as a retreating direction; and the parking lock device is configured to include a second switching mechanism that is mechanically switched in accordance with relative movement of the head moving member and the parking head such that when the parking head reaches the parking position and the head moving member is relatively moved in the advancing direction with respect to the parking head, a state becomes a lock state in which the parking head is positioned in a fixing member so as to suppress the parking head from retreating to the non-parking position side, and when the head moving member is made to relatively move in the retreating direction in the lock state, positioning of the parking head with respect to the fixing member is released and the state becomes a non-lock state in which retreat of the parking head is allowed.

2. The vehicular parking device according to claim 1, wherein:

the parking lock device is configured to include a first member that is moved integrally with the head moving member and a second member that is moved integrally with the parking head;

the second member includes a first fitting portion provided with a first fitting hole to which the first member is fitted so as to be movable in an axial direction, and a second fitting portion fitted in a second fitting hole provided in the fixing member such that the second fitting portion is movable in the axial direction, the first fitting portion and the second fitting portion being provided on the same axis;

the first switching mechanism includes a first locking member disposed so as to be able to project outward from an outer peripheral surface of the first member, a first engaging recess portion that is provided on an inner peripheral surface of the first fitting hole of the second member and that is engaged with the first locking member, and an elastic member that urges the first locking member so as to project outward, the first locking member is engaged with the first engaging recess portion in accordance with an urging force of the elastic member, causing the first member and the second member to be brought into the connecting state, and the first locking member is pushed inward of the first member against the urging force of the elastic member, causing the first member to be brought into the non-connecting state in which the first member is allowed to be relatively moved in the advancing direction with respect to the second member; and the second switching mechanism includes a second locking member disposed so as to be able to project outward from an outer peripheral surface of the second fitting portion of the second member, a second engaging recess portion that is provided on an inner peripheral surface of the second fitting hole of the fixing member and that is engaged with the second locking member, and a pushing out engaging portion that is provided in the first member and that pushes the second locking member outward and makes the second locking member engage with the second engaging recess portion when the parking head reaches the parking position and the first member is moved relative to the second member in the advancing direction, the second locking member being brought into the lock state in which the second member is suppressed from retreating to the non-parking position side by the second locking member being pushed outside from the second member by the pushing out engaging portion and engaged with the second member, and the non-lock state due to release of engagement of the second locking member and the second engaging recess portion by the pushing out engaging portion is released when the first member is caused to relatively retreat to the non-parking position side with respect to the second member in the lock state.

3. The vehicular parking device according to claim 2, wherein the fixing member is provided with a pushing in engaging portion that is engaged with the first locking member projecting outward from an outer peripheral surface of the first member, immediately before the parking head is made to move to the parking position, and that pushes in the first locking member to an intermediate position against the urging force of the elastic member.

4. The vehicular parking device according to claim 2, wherein:

a pair of the first locking members is arranged symmetrically with respect to the axis in a through hole provided so as to be orthogonal to an axis of the first member, the first locking members are urged in opposite directions away from each other by the common elastic member disposed between the first locking members, and the first locking members protrude outward from an outer peripheral surface of the first member and are engaged with the first engaging recess portion; and a pair of the second locking members is arranged symmetrically with respect to the axis in a through hole provided so as to be orthogonal to an axis of the second member, the second locking members are pushed out in opposite directions away from each other by the common pushing out engaging portion disposed in the first member so as to project along an axis of the second member, and the second locking members protrude outward from an outer peripheral surface of the second member and are made to engage with the second engaging recess portion.

* * * * *